March 20, 1962 J. F. COULEUR 3,026,034

BINARY TO DECIMAL CONVERSION

Filed Oct. 7, 1957

INVENTOR:
JOHN F. COULEUR,

BY Donald C Keaveney
HIS ATTORNEY.

3,026,034

BINARY TO DECIMAL CONVERSION

John F. Couleur, Fayetteville, N.Y., assignor to General Electric Company, a corporation of New York Filed Oct. 7, 1957, Ser. No. 688,509
8 Claims. (Cl. 235—155)

This invention relates to a method and apparatus for converting a representation of data in a first number system to an equivalent representation in a second number system. More particularly, this invention relates to a method and apparatus for converting a pure binary number to a binary coded decimal number. The converse problem of converting a binary coded decimal number to a pure binary number forms the subject matter of an application entitled "Decimal to Binary Conversion" filed by John F. Couleur concurrently herewith and assigned to the same assignee as the present application.

It is well known in the digital computing arts that any given number can be expressed in many different number systems, each using a different number base or radix. The number system in common everyday use is, of course, the decimal system in which a base or radix of 10 is used. Each digit of a number is then understood to be a multiplier or coefficient of a power of 10, the power implied increasing from right to left in accordance with the positional significance of the digit. Thus, the decimal number 217 may be explicitly written as $2\times10^2+1\times10^1+7\times10^0$. Although many digital computers have been built which are designed to operate on an essentially decimal basis, many of the more modern digital computers are designed to operate on data expressed in pure binary notation rather than in decimal notation. In the binary number system, of course, a number base of two is used in place of the number base or radix ten used in the decimal system. Thus, the decimal number 7 may be explicitly written in pure binary form as $1\times2^2+1\times2^1+1\times2^0$. More briefly, this binary 7 is commonly written as 111 wherein the number base two is implied and only the coefficients are expressed. Furthermore, those computers which do operate on decimal data frequently use a number system known as binary coded decimal rather than pure decimal. Thus, the decimal number 217 in binary coded decimal form can be explicitly expressed as $$(0\times2^3+0\times2^2+1\times2^1+0\times2^0)10^2+(0\times2^3+0\times2^2+0\times2^1+1\times2^0)10^1+(0\times2^3+1\times2^2+1\times2^1+1\times2^0)10^0$$

More briefly, this number is commonly written as 0010 0001 0111. It will be noted that the implied radix for each group of four binary digits is still 10, but that each decimal digit is individually expressed in four place binary notation in order to render the data more tractable to machine techniques. For a more complete discussion of arithmetic or number systems, reference is made to a book entitled "High Speed Computing Devices" written by the staff of Engineering Research Associates, Inc., and published by McGraw Hill, New York, 1950, or to a book entitled "Arithmetic Operations in Digital Computers" written by R. K. Richards and published by D. Van Nostrand Co., New York, 1955.

It has long been known that the arithmetic process of converting a pure binary number to a binary coded decimal number consists of repeated division of the binary number by binary 10, the decimal number base, and noting the remainder after each division as digits of the binary coded decimal number. The instrumentation of this process, however, using standard division techniques has in the past required cumbersome and expensive equipment and has been excessively time consuming. The problems of feeding pure binary data to a binary coded decimal computer or of providing decimal read-out for binary data, for example, have in the past been solved by using either an elementary computer or a time consuming counting process in order to perform the necessary conversion from one number system to the other.

It is, therefore, an object of this invention to provide a method and apparatus for rapidly and economically converting a representation of data in a first number system to an equivalent representation of data in a second number system.

It is a more specific object of this invention to provide a method and apparatus for converting a pure binary number to a binary coded decimal number.

It is a still further object of this invention to provide a new and improved method and apparatus for processing data.

Briefly, in accordance with one aspect of this invention, a number which is represented in pure binary form is read into a shift register having 4N stages grouped to form N decades, the content of each decade representing one decimal digit of said number. The conversion process consists of shifting the binary number into the register one binary digit or bit at a time, most significant digit first, testing the magnitude of the content of each decade before each shift, and adding binary three to any decade the binary content of which is found to have been equal to or greater than five before each shifting step. The resulting content of the register can then be shown to be a binary coded decimal representation of the pure binary number applied to or fed into the register.

While the novel and distinctive features of the invention are particularly pointed out in the appended claims, a more expository treatment of the invention, in principle and in detail, together with additional objects and advantages thereof, is afforded by the following description and accompanying drawings in which;

Figures 1, 2:
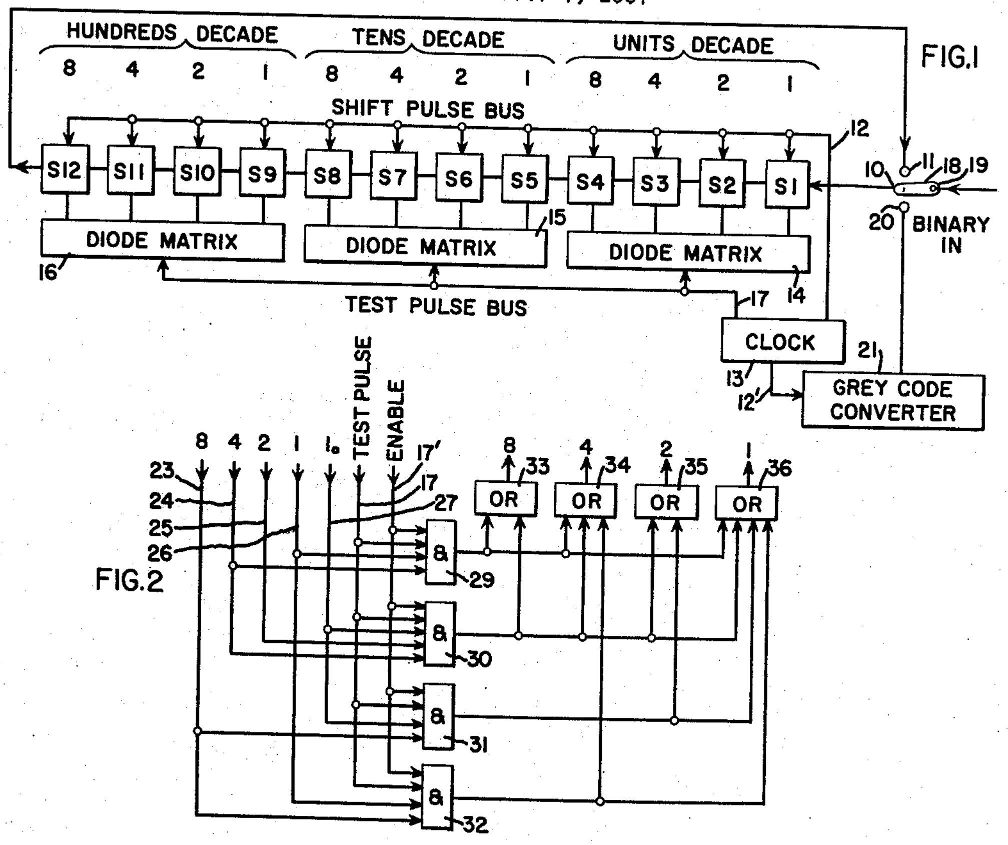
FIG. 1 is a block diagram of the conversion apparatus.
FIG. 2 is a schematic block diagram of the logic circuitry embodied in each of the diode matrices shown in FIG. 1.

Turning now to the drawing and in particular to FIG. 1 thereof, there is shown a shift register which, by way of example only, is illustrated as consisting of the twelve stages, S1 through S12. Of course, it will be understood that a shift register of any desired number of stages could be used, there being in general 4N stages for a binary number which is to be converted to an N digit decimal number. Thus, the four stages, S1, S2, S3, and S4, which are associated with the diode matrix 14 are indicated in FIG. 1 as comprising the units decade of the shift register; the four stages, S5, S6, S7, and S8, which are associated with diode matrix 15 are indicated as comprising the tens decade of the shift register; and the four stages, S9, S10, S11, and S12, which are associated with diode matrix 16 are indicated as comprising the hundreds decade of the shift register. There are thus N decades and 4N stages for an N digit decimal number. Each stage of a decade may contain or represent either a binary "one" or a binary "zero." However, when the number to be represented is in binary coded decimal form, the stages of each decade are assigned respective weights of 8, 4, 2, and 1 decreasing in significance in the same direction as do the decades throughout the register as shown in FIG. 1. These weights, of course, are simply the implied powers of the number base 2 which, as explained above, are implicit in the binary coded decimal form. That is, $1=2^0$, $2=2^1$, $4=2^2$, and $8=2^3$. Similarly, each decade has impliedly associated therewith a power of 10 which increases from right to left. The weights 8, 4, 2, and 1 will hereinafter be used generically to refer to the corresponding stage of any one of the decades. Thus, a "4" stage will be used to mean any or all of the stages S3, S7, and S11.

Any conventional type of shift register such as those shown at pages 144–148 of the Richards' reference previously cited, may be used. As is well known in the art, each stage of such a register consists of a bistable device which may, for example, comprise a vacuum tube "flip-flop," a similar transistor circuit, or a bistable magnetic circuit. As is common practice, one of the two states of each bistable device is taken to represent a binary zero, whereas the other state of the device is taken to represent a binary one. The stages of the register are connected in cascade or serial relation between an input terminal 10 and an output terminal 11. Each of the stages of the register is connected by a shift pulse bus 12 to a source 13 of clock pulses. As is also well known in the art, the circuitry of each stage is such that upon application of a shift pulse to the bus 12, each of the stages assumes the state of the preceding stage. That is to say, S12 assumes the state which S11 had, S11 assumes the state which S10 had, etc. Of course, the prior state of stage S12 is indicated in response to a shift pulse at terminal 11. That is to say, in accordance with the usual convention, if stage S12 contained a binary one a pulse will appear at terminal 11, whereas if stage S12 contained a binary zero no pulse will appear at terminal 11 in response to the application of a shift pulse. It will thus be noted that the register is connected to shift its content from right to left as shown in FIG. 1.

Each decade of the register has associated therewith a logic circuit, such as one of the diode matrices 14, 15, and 16 shown in FIG. 1 as connected respectively to the units decade, the tens decade, and the hundreds decade. Examples of such matrices or diode networks may be found at pages 71–77 of the above cited Richards' reference. Typical "and" and "or" circuits are illustrated on page 32 of the Richards' reference. Each of the diode matrices 14, 15, and 16 may, for example, consist of a logic circuit of type shown by way of example in the block schematic diagram of FIG. 2. A test pulse bus 17 connects each of the diode matrices to the clock 13. The clock 13 may, for example, consist of a free-running multivibrator which puts out pulses alternately, first on the test pulse bus 17 and then on the shift pulse bus 12. During each complete cycle of the multivibrator one test pulse and one shift pulse will thus be emitted. The length or duration of this cycle is, of course, determined by the frequency of the multivibrator which thereby determines the duration of each of the series of time intervals during which the steps of the conversion process are carried out. The clock also includes a counter circuit which is connected to shut off the multivibrator after the desired number of pulses have been emitted as will be explained in greater detail below. Reference is made to such a clock at page 322 and at pages 337–341 of the above cited Richards' reference.

Input terminal 10 is shown connected by way of a switch arm 18 to a terminal 19 to which a pure binary number input may be serially applied from any external source. In this manner of connection it is assumed that the shift register is initially empty, that is, all stages are set at zero, and the binary input is simultaneously read into the register and converted to binary coded decimal form. If the register initially contains a number in pure binary form which one desires to convert to binary coded decimal form, switch arm 18 may be moved to output terminal 11 so as to connect the output of the register to its input, thus forming a ring. In this mode of operation provision must also be made for the clock 13 to emit an "enable" pulse or signal along the plural channel test pulse bus 17 to prevent the diode matrices from operating upon the incoming binary codede decimal number as if it were a pure binary number to be converted. These "enable" pulses are applied to input lead 17' upon each diode matrix as shown in FIG. 2 in a manner which will be described in greater detail below. Switch arm 18 may also be connected to a terminal 20 to receive a binary number converted from a "reflected binary" number, that is, a number expressed in the well known Grey code, by a Grey code converter 21. A description of such a converter may be found at pages 311–313 of the above cited Richards' reference. Since the conversion from pure binary form to decimal coded binary is performed in the shift register by operating upon the most significant digit first, a standard Grey code converter can readily be used and may be timed by pulses emitted over lead 12' to operate simultaneously with the shift register so that the conversion from Grey code to binary coded decimal takes substantially no more time than does the conversion from pure binary to binary coded decimal.

In any position of the switch 18 a pure binary number is applied in serial form to input terminal 10. This pure binary number may come from the shift register itself via output terminal 11, from an external source via terminal 19, or from Grey code converter 21 via terminal 20. Whatever the source of the pure binary number may be, however, the conversion from binary to binary coded decimal is accomplished in the diode matrices associated with the register which determine if any one of the decades contain a number equal to or greater than five before each shifting step. If any decade contains a five or greater, binary three is added to the content of this decade to compensate for the loss of six involved in shifting a one from the 8 position of a lower decade to the units position of the next higher decade. This loss of six comes from the fact that a binary number should double in value when shifted one place from right to left. A five or greater would, therefore, become ten or greater and a one should be placed in the units position of the next decade. In the 8 position of a lower decade, however, a binary one has a value of eight, whereas in the unit position of the next higher decade it has a value of only ten rather than the sixteen which it should have if eight were doubled. This loss of six is compensated for by adding three prior to the shifting step. Of course, the shift will accomplish a multiplication by 2 so that the three added before the shift is equivalent to six added after the shift.

The diode matrix shown in FIG. 2 is based on the following logic. A binary coded decimal number no higher than 9 can appear in any decade after shifting. Therefore, there are five binary coded decimal numbers equal to or greater than five to which three must be added. The numbers and the sum of the number, plus three, are as shown in the chart below.

| NUMBER | | | | SUM | | | |
|---|---|---|---|---|---|---|---|
| 8 | 4 | 2 | 1 | 8 | 4 | 2 | 1 |
| 0 | 1 | 0 | 1=5 | 1 | 0 | 0 | 0=8 |
| 0 | 1 | 1 | 0=6 | 1 | 0 | 0 | 1=9 |
| 0 | 1 | 1 | 1=7 | 1 | 0 | 1 | 0=10 |
| 1 | 0 | 0 | 0=8 | 1 | 0 | 1 | 1=11 |
| 1 | 0 | 0 | 1=9 | 1 | 1 | 0 | 0=12 |

It is convenient in a shift register to accomplish this addition of three by flipping, or complementing, digits, that is to say, by changing a zero to a one, or a one to a zero by changing the electrical state of the bistable device in the affected stage. From the above chart it will be seen that the requirements for adding three when the number in a decade is equal to or greater than five may be expressed in the logic equations below, wherein numerals are used to designate stages of a decade and the binary content of a stage is written out as "one" or "zero."

If 4 and 1 are one, then 8, 4, and 1 must flip;

If 4 and 2 are one, and 1 is zero, then 8, 4, 2, and 1 must flip;

If 8 is one and 1 is zero, then 2 and 1 must flip;

If 8 is one and 1 is one, then 4 and 1 must flip.

The matrix of FIG. 2 is designed to sense which, if any, of these requirements are met and to put out the pulses to flip the required stages in accordance with the foregoing logic equations. In FIG. 2 the lines 23, 24, 25, and 26 are connected as inputs to the matrix from the "one" outputs of the register stages having weights of 8, 4, 2, and 1 respectively, whereas the line 27 is connected as an input from the "zero" output of the unit stage. That is to say, the lines 23, 24, 25, and 26 will be activated if their respective stages contain a binary one, whereas the line 27 will be activated if its stage contains a binary zero. This is indicated in FIG. 2 by the zero subscript on the designation $1_0$ associated with line 27.

These input lines are connected to various ones of a group of logical "and" circuits 29, 30, 31, and 32. Each of the "and" circuits is such that it will emit or transmit a pulse only in response to the simultaneous application of a pulse to all of its input terminals. Many such circuits are known in the art and each of the circuits 29 through 32 may be of any conventional type such as, for example, an appropriately connected diode stage. Line 23 is connected as an input to the "and" circuits 31 and 32; line 24 is connected to the "and" circuits 29 and 30; line 25 is connected to "and" circuit 30; line 26 is connected to the "and" circuits 29 and 32; whereas line 27 is connected to the "and" circuits 30 and 31. Both the test pulse input line 17 and the "enable" pulse input line 17' are connected as inputs to all of the "and" circuits 29 through 32.

It will be understood that the connections shown in FIG. 1 between the various blocks are shown as single line connections but are intended to imply a plural channel cable when appropriate. That is to say, the lines 26 and 27 are both inputs to the diode matrix from the stage S1, for example, and are shown in FIG. 1 as a single line which represents not only the lines 26 and 27 but also the output from the matrix 14 back to the stage S1.

The diode matrix also includes a group of four "or" circuits 33, 34, 35, and 36. Each of the "or" circuits 33 through 36 may be of any conventional type and has the property that it will provide an output pulse in response to a signal or pulse applied at any one of its input terminals. The output of "and" circuit 29 is connected as an input to each of the "or" circuits 33, 34, and 36. The output from "and" circuit 30 is connected to each of the "or" circuits 33, 34, 35, and 36. The output from "and" circuit 31 is connected to "or" circuits 35 and 36. The output from "and" circuit 32 is connected to the "or" circuits 34 and 36. The outputs from these "or" circuits are connected back to the respective stages of its associated decade as indicated by the arrowed designations in FIG. 2 and are used as the flipping pulse which perform the addition in accordance with the chart and logic equations given above.

Figure 3:
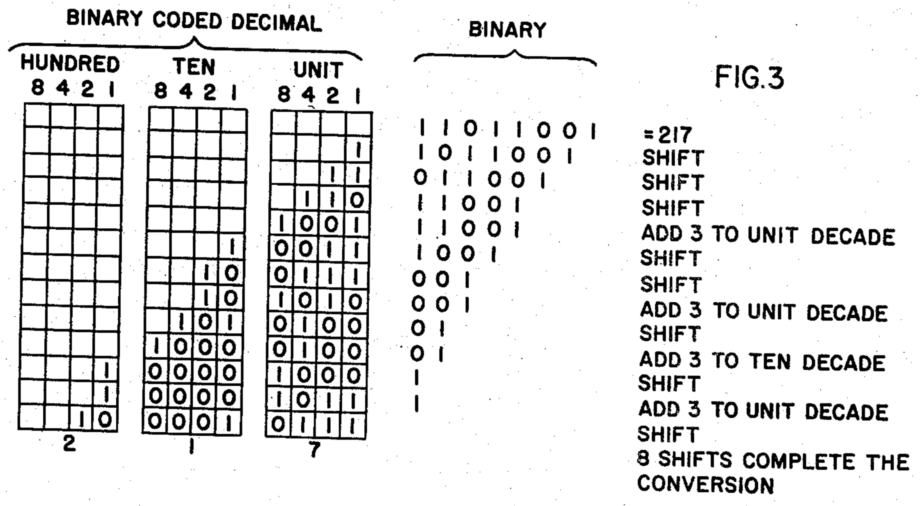
FIG. 3 is a chart illustrating the operation of the apparatus of FIGS. 1 and 2.

Turning now to FIG. 3 there is shown a chart illustrating the operation of the system of FIGS. 1 and 2 in converting the binary number 11011001 (which is equal to the decimal number 217) to a binary coded decimal form. It will be noted that the twelve columns of the chart under the bracket labeled "Binary Coded Decimal" represent the twelve sages of the shift register, the entry in each position being the content of the particular stage at a given time. The thirteen rows of the chart represent the thirteen different steps involved in the conversion process for this particular number. Thus, it will be noted that in the first step the register is empty and the binary number to be read in is shown to the right of the register under the bracket labeled "Binary." The binary number is applied to the input terminal 10 one bit or digit at a time, most significant digit first, after first testing the content of each decade. Thus, in the second row of the chart the first binary one is shown as having been read into the formerly empty register by a shifting step. Before the next shifting step the clock 13 emits a pulse along test bus 17 to determine if any of the decades contain a number equal to or greater than five. Inasmuch as none of the decades contain such a number this particular step is not indicated in the chart. The clock 13 next emits another shift pulse along line 12 which moves the next digit or bit of the binary number into the register to produce the configuration shown in row three. Again, a test pulse determines that no decade contains five or greater and another shift pulse produces the configuration shown in row four, wherein the units decade contains the binary expression 110 which, of course, is equal to decimal six. Hence, when clock 13 emits the next test pulse, the units decade does contain a number greater than five and the diode matrix 14 responds to add three to the content of the units decade producing the configuration shown in row five of the chart.

The next shift pulse produces the configuration shown in row six of the chart which, upon application of a test pulse, is found not to include a number equal to or greater than five in any decade. Another shift pulse produces the configuration shown in row seven of the chart. Now, upon an application of a test pulse the unit decade is found to contain a binary representative of seven. Addition of three to this decade produces the configuration shown in the eighth row of the chart. Another shift pulse produces the configuration shown in row nine which, upon application of a test pulse, is found to include a number equal to five in the tens decade. Addition of three to the tens decade produces the configuration shown in the tenth row of the chart which is then shifted by application of another shift pulse to produce the configuration of the eleventh row of the chart. Application of a test pulse to this configuration reveals the number eight in the units decade. Addition of three to this decade produces the configuration shown in the twelfth row of the chart. Finally, application of another shift pulse produces the configuration shown in the thirteenth and final row of the chart and completes the conversion process. It will be noted that after the final shift pulse, the hundreds decade contains a binary representation of the decimal number two, the tens decade contains a binary representation of the decimal number one, and the units decade contains a binary representation of the decimal number seven. Hence, the shift register decades contain a binary coded decimal representation of the number 217, the original binary number read into the register. The conversion process, it will be recalled, consisted of shifting the binary number into the register one bit at a time, most significant bit or digit first, testing the content of each decade prior to each shift pulse, and adding three to the content of any decade which is equal to or greater than five before the application of each shift pulse.

If the switch arm 18 in FIG. 1 is placed on terminal 11 rather than on terminal 19, a binary number which had originally been stored in the shift register itself may be recirculated and applied to the input of the register for conversion to binary coded decimal form. Where such double use of the register is desired, however, it is necessary to prevent the high order decade matrices from operating until the binary number has been removed from the register. This may readily be accomplished by applying an "enable" pulse generated by clock 13 under the control of its counter along the cable 17 to an input 17' of each of the diode matrices. The input 17' is connected to each of the "and" circuits 29, 30, 31, and 32 with the result that none of these circuits can have an output in the absence of a pulse on line 17'. When this double use of the register is desired an "enable" pulse is applied only to diode matrix 14 during the fourth, fifth, sixth and seventh test steps, to diode matrices 14 and 15 during the next four test steps, and to all of the diode matrices during the last two test steps. That is to say, an "enable" pulse is applied to a diode matrix only during such intervals as its associated decade could possibly contain a binary coded decimal number equal to or greater than five. With this mode of operation a binary number which has originally been stored in the twelve stages of the register may be operated on and in a sequence of at most 24 steps transferred out of the register at terminal 11 and back into the other end of the register as a binary coded decimal representation of the original number. The binary coded representation may then be read out of the register in either parallel or serial form or displayed by any other convenient method.

As noted above, if a reflected binary number, that is to say, a number expressed in which is commonly known as "Grey code" is to be converted to binary coded decimal form, switch 18 is placed on terminal 20 in order to apply the output of Grey code converter 21 to input terminal 10. In practice, converter 21 consists of nothing more than an "and" circuit which may be operated synchronously with the binary to binary coded decimal converter using the standard method of serial conversion from Grey to binary code.

It should be noted that this binary to binary coded decimal conversion operation could be performed faster by the use of a more complex matrix which would permit the test and shift steps to be conducted simultaneously. It will also be apparent to those skilled in the art that other logic equations could be used to satisfy the conditions listed in the chart above and would result in specifically different matrix circuits which would, nonetheless, give the same result. Furthermore, the necessary addition of three could, of course, be performed by any conventional arithmetic circuitry rather than by matrices. The use of the matrices is, however, an especially desirable and preferred embodiment in view of the convenience of complementing or flipping the stages of the register. It should further be noted that a similar type of conversion process is applicable as between number systems other than binary and binary coded decimal forms. For example, a tertiary number could be converted to a tertiary coded duodecimal number by a similar technique.

It is believed that these alternatives will be more readily apparent by considering the foregoing specific exemplary embodiment of the invention from the following point of view. It will be recalled that the classic method of converting a binary number to a binary coded decimal number is to perform a repeated division by binary ten on the binary number, treating the remainder of each division as a decimal digit in binary coded form, and again dividing the quotient by ten, to obtain the next digit, etc. This process is repeated until the binary number has been reduced. It can be shown that the matrix of each decade performs a binary division by ten and that the number shifted out of each decade to the next higher order decade of the shift register of FIG. 1 is the quotient of its input divided by ten. The number left in the decade, after the shifting process is complete, is the remainder of this division.

Recalling the method of performing binary division, the most significant digits of the dividend are examined, and if larger than the divisor, a one is put in the quotient and the divisor is subtracted from the most significant digits of the dividend. When dividing by ten, if the four most significant digits of the dividend are ten or greater, a one is put in the quotient and ten (binary 1010) subtracted from these four most significant digits. The next most significant digit is tacked onto the end of the remainder and the process repeated, i.e.

```
                11 Quotient
Divisor 1010/11111 Dividend
             1010
             ----
              1011
              1010
              ----
                 1 Remainder
```

Knowing that shifting toward a more significant digit will double a binary number, the process of division by ten can be performed prior to a shift by using five (binary 101) instead of ten as a divisor. If the first three digits are five or greater, five is subtracted, one put in the quotient, and the shift accomplished.

Consider the unit decade. The binary number is shifted in most significant digit first. Prior to each shift, the number in the decade is tested for a five or greater. After three or more shifts, the contents of the register may be five or greater. If five is subtracted from this number and a one put in the 8 stage, the next shift pulse will transfer the one to the 1 stage of the next higher decade, double the remainder of the subtraction which has been left in the first decade, and bring in the next binary digit. This is identical to the process of division with the quotient being formed in the unit stage of the tens decade, the remainder being formed in the unit decade, and the lesser significant digits of the binary number being entered into the 1 stage of the unit decade. Since the process of subtracting five from a number equal to or greater than five and putting a one in the 8 stage of the decade is arithmetically identical to adding three to a number equal to or greater than five, the process previously described above is clearly one of repeated division by ten. It will be obvious that apparatus other than the matrices illustrated could be used to perform the necessary arithmetic of this process as described above. The matrices illustrated are, however, a preferred embodiment of the invention since shift register stages lend themselves well to the resulting complementing process.

It should further be noted that, as pointed out above, the word "shift register" has been used to mean any apparatus for storing and progressively transferring data in order to facilitate its sequential examination. The logic circuits are illustrated as having an operating position which is fixed relative to the moving data. It will be apparent, however, that the same relationship could be achieved and the same process carried out by considering the data to be held in a fixed position and sequentially transferring the logical operations performed upon the data relative thereto. Such a transfer of logic operations could be carried out, for example, by means of stepping switches scanning information stored in relays or any other bistable device. Of course, any such apparatus is essentially nothing more than an equivalent of the shift register and matrices described above, since in either case the conversion process is, of course, made possible by the relative progressive motion of the sequence of bits of information with respect to the register or other data representation means.

While the principles of the invention have now been made clear, there will be immediately obvious to those skilled in the art many modifications in structure, arrangement, proportions, the elements and components used in the practice of the invention, and otherwise, which are particularly adapted for specific environments and operating requirements without departing from those principles. The appended claims are, therefore, intended to cover and embrace any such modifications within the limits only of the true spirit and scope of the invention.

What I claim and desire to secure by Letters Patent of the United States is:

1. Apparatus for converting a representation of data in a number system of a first radix to an equivalent representation in a number system of a second radix comprising, a shift register having an integral number of cascaded stages, the stages of said register being divided into a smaller integral number of subgroups, each subgroup consisting of the same number of consecutively adjacent stages, each of said stages comprising a multistable state device, the states of said individual stages being used to represent one digit of data in said number system of the first radix, the total configuration of states of the stages of each subgroup being used to represent one digit of data in said number system of the second radix; clock means connected to shift the entire content of said register one stage at a time during each of a series of time intervals of predetermined duration, and means controlled by said clock means and connected to perform a predetermined arithmetic operation during each of said time intervals on the data then in any one of said subgroups which satisfies a predetermined criteria, which comprises restoring to each subgroup a value equal to the difference in weighted value between the least significant digit of the next higher order subgroup and what the value of the digit would be if the least significant digit of the next higher subgroup were of the same radix as digits of the present subgroup.

2. Apparatus for converting a representation of data in a number system of a first radix to an equivalent representation in a number system of a second radix comprising, a shift register having an integral number of cascaded stages, the stages of said register being divided into a smaller integral number of subgroups, each subgroup consisting of the same number of consecutively adjacent stages, a source of clock pulses, means to apply said clock pulses in a sequence in which every other one of said clock pulses is used as a test pulse to test the magnitude of the data represented in each of said subgroups and the remaining alternate ones of said clock pulses are used as shift pulses to shift the content of said register by one stage; and individual means connected to each of said subgroups of stages and responsive to said test pulses to perform an arithmetic operation on the data in any one of said subgroups which satisfies a predetermined criteria, which comprises restoring to each subgroup a value equal to the difference in weighted value between the least significant digit of the next higher order subgroup and what the value of the digit would be if the least significant digit of the next higher subgroup were of the same radix as digits of the present subgroup.

3. Apparatus for converting a binary representation of an N decimal digit number to an equivalent binary coded decimal representation thereof comprising, a shift register having 4N cascaded stages grouped to form N decades of consecutively increasing decimal significance, the four binary stages of each of said decades having decimal weights of 1, 2, 4, and 8 respectively and arranged in increasing order of weight in the same direction as said decades increase in significance throughout said register, the sum of the weighted binary content of the four stages of each decade representing one digit of said N digit decimal number; first means to apply said binary number one digit at a time, most significant digit first, to the least significant stage of said shift register, second means to add binary three to the content of any decade containing a number equal to or greater than five, and third means to shift the entire content of said register one stage at a time in said direction of increasing significance, said third means also synchronizing the operation of said first and second means.

4. Apparatus as in claim 3 wherein said first means to apply said binary number is a Grey code converter.

5. Apparatus as in claim 3 wherein said first means to apply said binary number is a connection from the most significant stage of said register to said least significant stage of said register, and wherein said third means includes means to selectively render said second means operative or inoperative during different time intervals.

6. Apparatus as in claim 3 wherein said second means comprises a plurality of diode matrices, one of said matrices being connected to each of said decades.

7. Apparatus for converting a binary representation of an N decimal digit number to an equivalent binary coded decimal representation thereof comprising, a shift register having 4N cascaded stages grouped to form N decades of consecutively increasing decimal significance, the four binary stages of each of said decades having decimal weights of 1, 2, 4, and 8 respectively and arranged in increasing order of weight in the same direction as said decades increase in significance throughout said register, the sum of the weighed binary content of the four stages of each decade representing one digit of said N digit decimal number; means to apply said binary number serially most significant digit first to the least significant stage of said shift register; individual logic circuit means associated with each of said decades, each of said logic circuit means being connected to add binary three to the content of any decade containing a number equal to or greater than five in response to the application of a test pulse to said logic circuit; clock means connected to apply pulses in a recurring sequence in which every other one of said pulses is applied as a test pulse to all of said logic circuits and the remaining alternate ones of said pulses are applied as shift pulses to shift the entire content of said register by one stage in said direction of increasing significance said clock means including a counter connected to control the total number of pulses emitted by said clock means.

8. Apparatus for converting a representation of data in a number system of a first radix to a number system of a second radix comprising a shift register having an integral number of cascade stages, the stages of said register being divided into a smaller integral number of subgroups, each state of each stage being used to present a different digit of data in said number system of the first radix, the total configuration of states of the stages of each subgroup being used to represent a different digit of data in said number system of the second radix, means for shifting the entire content of said register, and means for restoring to each subgroup a value equal to the difference in weighted value between the least significant digit of the next higher order subgroup and what the value of the digit would be if the least significant digit of the next higher subgroup were of the same radix as digits of the present subgroup.

References Cited in the file of this patent

UNITED STATES PATENTS

| | | |
|---|---|---|
| 2,705,708 | Stone | Mar. 29, 1955 |
| 2,787,416 | Hansen | Apr. 2, 1957 |
| 2,799,450 | Johnson | July 16, 1957 |
| 2,823,855 | Nelson | Feb. 18, 1958 |

UNITED STATES PATENT OFFICE

CERTIFICATE OF CORRECTION

Patent No. 3,026,034 March 20, 1962

John F. Couleur

It is hereby certified that error appears in the above numbered patent requiring correction and that the said Letters Patent should read as corrected below.

Column 10, line 44, for "present" read -- represent --.

Signed and sealed this 3rd day of July 1962.

(SEAL)
Attest:

ERNEST W. SWIDER
Attesting Officer

DAVID L. LADD
Commissioner of Patents